United States Patent [19]

Flamand

[11] 3,994,647
[45] Nov. 30, 1976

[54] BLOW MOLDING APPARATUS

[75] Inventor: Guy A. Flamand, Chalon-sur-Saone, France

[73] Assignee: Carnaud Total Interplastic, Chalon-sur-Saone, France

[22] Filed: July 15, 1974

[21] Appl. No.: 488,435

[30] Foreign Application Priority Data
July 16, 1973 France .............................. 73.25982

[52] U.S. Cl. .............................. 425/142; 209/74 R; 425/217; 425/307
[51] Int. Cl.² .......................................... B29C 1/00
[58] Field of Search ........... 425/135, 116, 117, 216, 425/217, 215, 142, 308, 297, 317, 151, 241, DIG. 206, 212, 4, 311; 248/148, 161; 209/74; 249/66 A

[56] References Cited
UNITED STATES PATENTS

| | | | |
|---|---|---|---|
| 2,251,135 | 7/1941 | Iknayan et al. | 246/66 A |
| 3,564,652 | 2/1971 | Baugnies | 425/311 |
| 3,581,888 | 6/1971 | Kelly | 209/74 |
| 3,601,858 | 8/1971 | Blanchard | 425/DIG. 211 |
| 3,689,183 | 9/1972 | Denlinger | 425/217 |
| 3,782,876 | 1/1974 | Groff | 425/311 |
| 3,813,200 | 5/1974 | Gergely | 425/142 |

Primary Examiner—Francis S. Husar
Assistant Examiner—Robert J. Charvat
Attorney, Agent, or Firm—Pennie & Edmonds

[57] ABSTRACT

A blow molding machine having plural molds cyclically movable past an extruder for delivery to those molds of a tubular plastic parison includes a reciprocating blade which, upon interruption of the motion of the molds, is set in motion across the path of the parison emerging from the extruder to chop the parison into fragments and with a retractable trough for collecting the fragments for recycling or other disposition.

8 Claims, 3 Drawing Figures

BLOW MOLDING APPARATUS

The present invention relates to machines for blow molding hollow articles from a tubular parison of plastic material delivered by an extruder. In such machines an extruder delivers, usually continuously, a tube of plastic material, termed a parison, at a high temperature. A section of this tube as it emerges is enclosed between the two halves of a mold, within which the tube is blown to conform to the walls of the mold so as to produce a shaped article.

In machines of this character of the particular type termed discontinuous parison machines, cutting means are provided for cutting the parison which however operate only once for each hollow article produced, cutting the parison to lengths sufficient for manufacture of the desired hollow bodies. In contrast, in machines of this character of the particular type called continuous parison machines there is no such cutting means. Instead, successive lengths of the continuously emerging parison are seized between the halves of a succession of mold half pairs which may be mounted for example on a turntable, the rim of which moves past the extrusion head. The mold halves close one after another on lengths of the hollow plastic material, which is cut off by the molds themselves as they close on the plastic material.

A similar mounting for the mold half pairs may also be employed in discontinuous parison machines.

With either type of machine, steps must be taken to dispose of the tubular plastic material which continues to emerge from the extruder in the event of stoppage of the molding process and consequent interruption in the motion of the molds, for example in the event of a malfunction of the molding and blowing apparatus proper.

Hitherto, such elimination was manually effected or was effected automatically by conveyor means which detach the hot plastic tube without chopping or grinding it and which then carry it outside the machine to cool.

The introduction of such automatic means eliminates the danger to the operator of introducing his hands into the machine, but it does not provide a satisfactory solution since the hot plastic material as extruded cools so slowly that, at least in the case of certain materials it is not possible to prevent decomposition or further chemical change therein. The result is the evolution of noxious gases such as hydrogen chloride and carbonization of part of the plastic material which renders it substantially useless and incapable of being recycled to the extruder.

According to the present invention, and in order to avoid these shortcomings, there are provided automatic means for cutting into small fragments the parison which continues to be extruded during any interruption in the operation of the machine. These automatic means include at least one cutting element and motor means adapted to cause this cutting element to operate cyclically across the path of motion of the parison emerging from the extruder.

By means of the invention therefore, the unwanted and unblown, unmolded parison is recovered in short lengths or fragments, e.g. of the order of one centimeter in length, which cool rapidly and without change in the nature the plastic material thereof. These fragments can after grinding be recycled into the extruder.

The cutting device may comprise for example two blades disposed on opposite sides of the parison and subjected to oppositely phased reciprocating translatory motions toward and away from the axis of the extruder head, these blades coming substantially into contact with each other in the vicinity of that axis, somewhat in the manner of a pair of shears.

In another embodiment of the invention the cutting device for the parison may include a single blade subjected to a reciprocating translatory motion transversely of the axis of the extruder head, moving back and forth through that axis.

It is also possible to use as a cutting device a blade pivotably mounted about an axis and subjected to a continuous rotating motion or to a reciprocating arcuate motion through the axis of the extruder.

In all these embodiments the parison cutting device is permanently disposed at a fixed position on the blow-molding machine, with the blade or blades thereof, when stationary, in a retracted position outside the path of the parison from the extruder so as to permit the parison to pass into the molds in normal operation. The blade is set into motion across the axis of the extruder, i.e. across that path, as soon as a variation or malfunction in the operation of the machine makes it desirable to withdraw the parison and to cut it into small pieces.

The fragments of the parison may advantageously be recovered in a trough which delivers them onto a conveyor, either a belt conveyor or a pneumatic conveyor for delivery to a grinding device or to a storage vessel.

DETAILED DESCRIPTION OF PREFERRED EMBODIMENT

Figure 1:
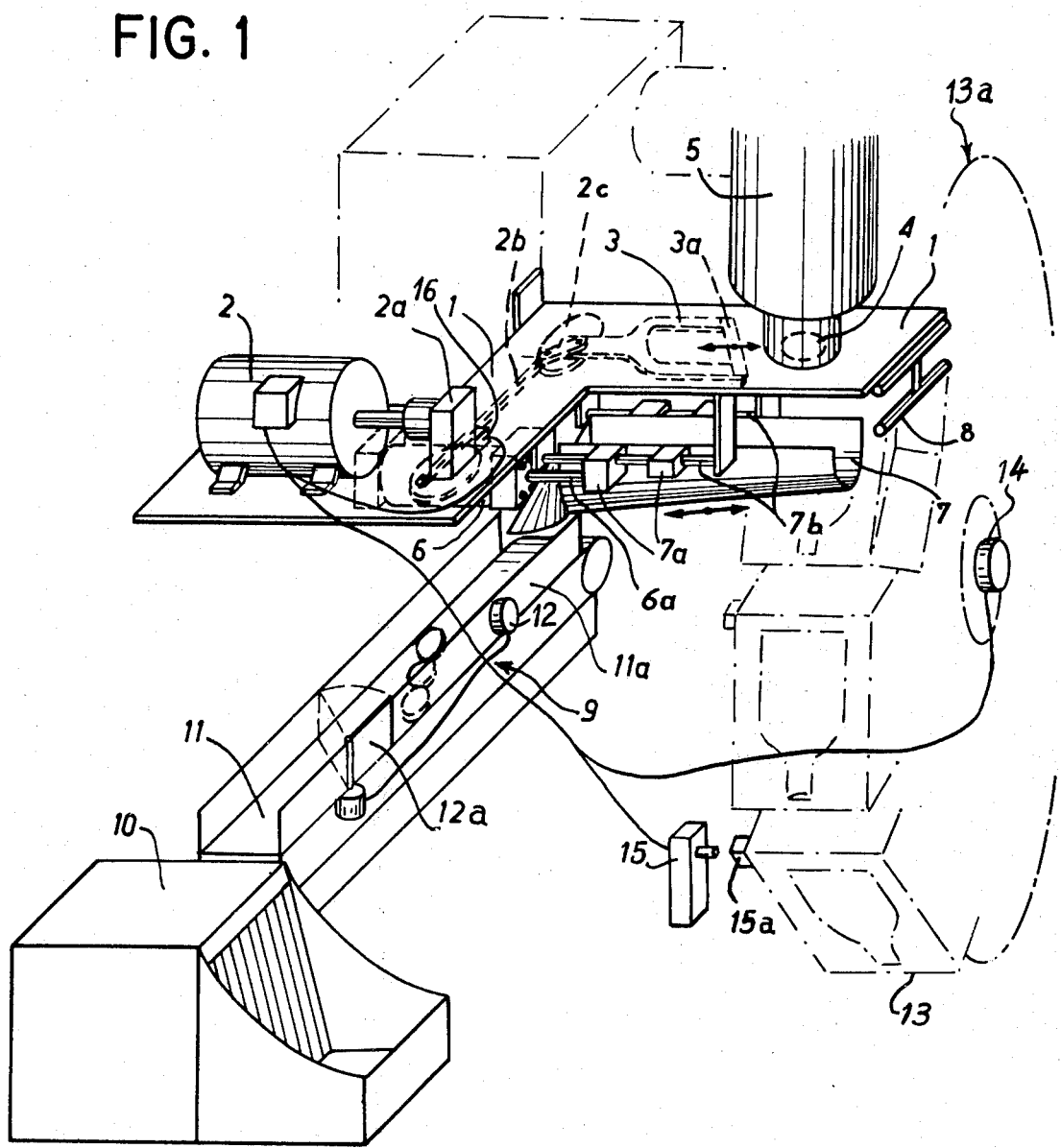
FIG. 1 is a perspective view of a blow molding machine including a parison cutting device in accordance with the invention.

In the drawing, the extruder 5 of the blow molding machine and the parison cutting or chopping device are shown in full lines whereas the remainder of the blow molding machine is schematically indicated in chain lines. The blow molding machine includes an extruder 5 and a plurality of openable and closeable pairs of mold halves 13. The pairs of mold halves are mounted on suitable carrying mechanism 13a, well-known in the art, which moves them cyclically in a closed path past the extruder 5, opening the halves of each pair prior to arrival at a position adjacent the extruder to eject a molded article and then to receive a length of parison from the extruder, and closing them thereafter for the blowing of the new parison.

The chopping device includes a base plate 1 on which is mounted a motor 2. The motor is equipped with a variable ratio speed reducer which, through an angle drive 2a and a transmission including a link 2b and a bell crank 2c, imposes reciprocating motion on a blade carrier 3 having a blade 3a mounted therein. The elements 2b, 2c, 3 and 3a are mounted beneath the plate 1 and therefore appear in phantom in the drawing.

Figure 3:
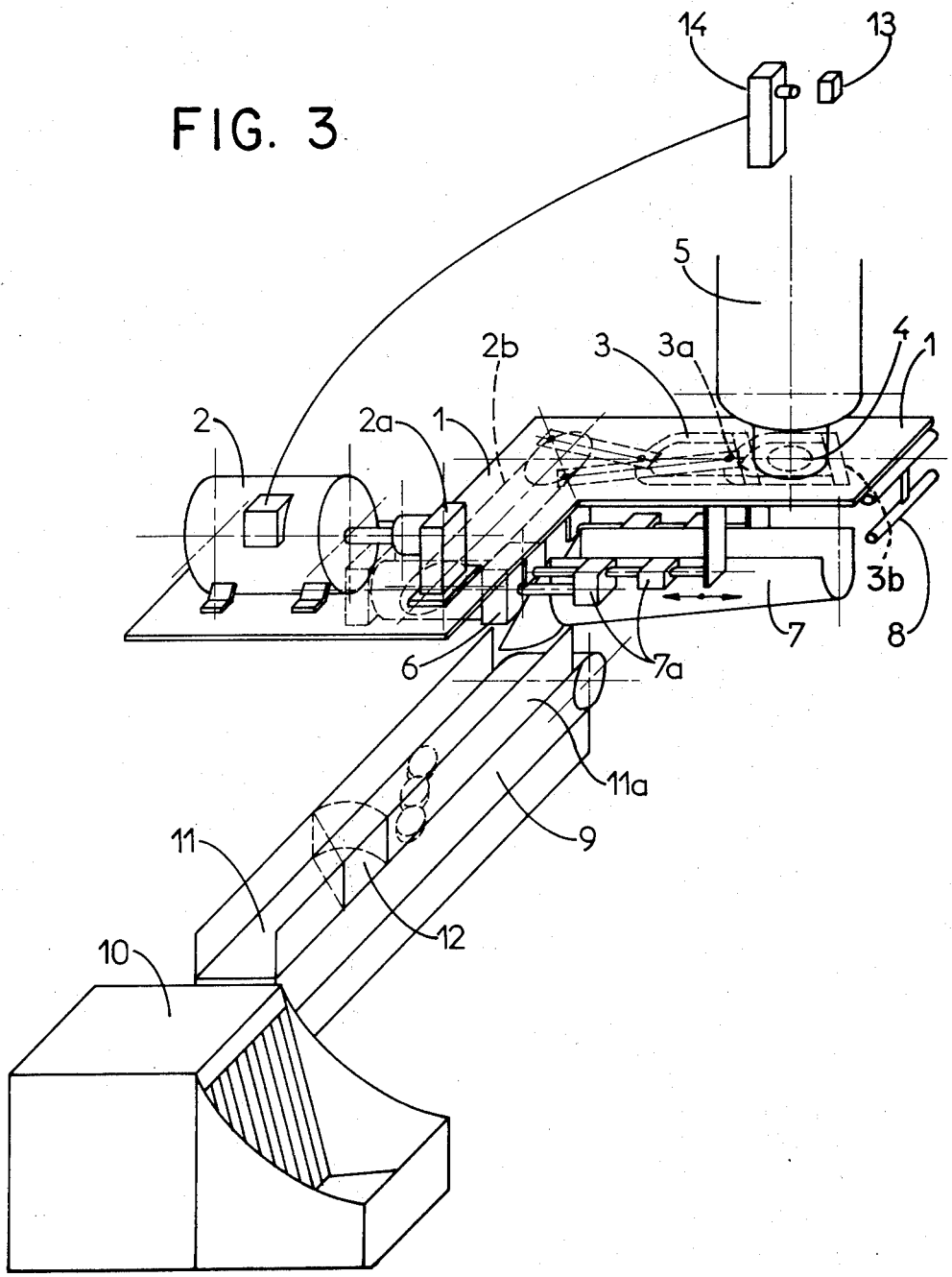
FIG. 3 is a view of a modified embodiment of the cutting device shown in FIG. 1.

With the embodiment of the invention as shown in FIG. 3 a pair of blades 3a3b are used. In this embodiment, linkage elements shown in broken lines and similar linkage elements 2b and 2c used in the construction of FIG. 1 are used for reciprocating the pair of blades 3a3b.

When the machine is in operation, the extruder head 5 continuously delivers a tubular parison which passes through an opening 4 provided in the base plate 1 into the path of the blade 3a when the parison chopping device is in operation, and into the path of the pairs 13 of mold halves, as previously described when the chopping device is not in operation.

Below the base plate 1 is disposed a trough 7 supported from blocks 7a which are slideably movable on rods 7b between a retracted position for the trough, which permits the parison to pass during normal operation of the machine into the path of the molds 13, and an advanced position, the one shown in the figure. In this advanced position, to which the trough is set upon activation of the parison cutting or chopping device, the fragments into which the emerging parison is chopped by the blade 3 will fall into the trough.

Passage of the trough 7 from its retracted to its advanced position is automatically effected for example by operation of the rod 6a from an electropneumatic actuating cylinder 6 when the parison chopping device is set into operation.

To insure that the chopped fragments of parison material produced by the knife 3 fall into the trough, there is provided a set of nozzles 8 which produce jets of air directed into the interior of the trough. These air jets operate not only to send the parison fragments into the trough but also to chill them, thereby avoiding decomposition or other chemical change of the plastic material thereof.

At the other end of the trough the parison fragments fall onto a conveyor generally indicated at 9 having an endless belt 11. At the end of the conveyor remote from the trough, the parison fragments fall into a grinder 10 or any suitable form of storage vessel.

The conveyor 9 may advantageously include an electronic detector 12 (for instance 16FS1 of HONEYWELL) which detects the presence of foreign matter, in fact of metallic particles, which might damage the blades of the grinding device 10 or otherwise pollute the plastic material to be recycled. This electronic detector may control operation of a gate 12a which, when shifted to the dash-line position shown therefore in the lateral wall 11a of the conveyor, interrupts the passage of the parison fragments toward the grinder. These fragments then fall to the outside of the conveyor.

Operation of the parison chopping device is automatically terminated when the two following conditions are fulfilled:
1. When, on start-up, the carrying device 13a, bearing the molds 13, reach operating speed, and
2. When, on start-up, a pair of mold halves moving toward the extruder has reached a position such that a suitable and not excessive length of parison will be extruded during the time required for that pair of mold halves to reach the position of the extruder.

Satisfaction of the first condition is detected by a revolution counter 14 which energizes a relay at a settled speed value. Satisfaction of the second condition is detected by the motion of a metallic element 15a fixed to each mold carrier past a detector switch 15 suitably adjusted in position on the machine frame (not shown) with respect to the extruder. These detectors are coupled to the control circuit for the motor 2. A switch 16 is provided at the out-shaft of 2a to insure that the motor 2 is de-energized just as blade 3a comes to rest in its retracted position, leaving the opening 4 clear. The trough 7 is simultaneously shifted to the left, in the figure, out of the path of the parison; jets of nozzles 8 and conveyor 9 are then stopped.

Figure 2:
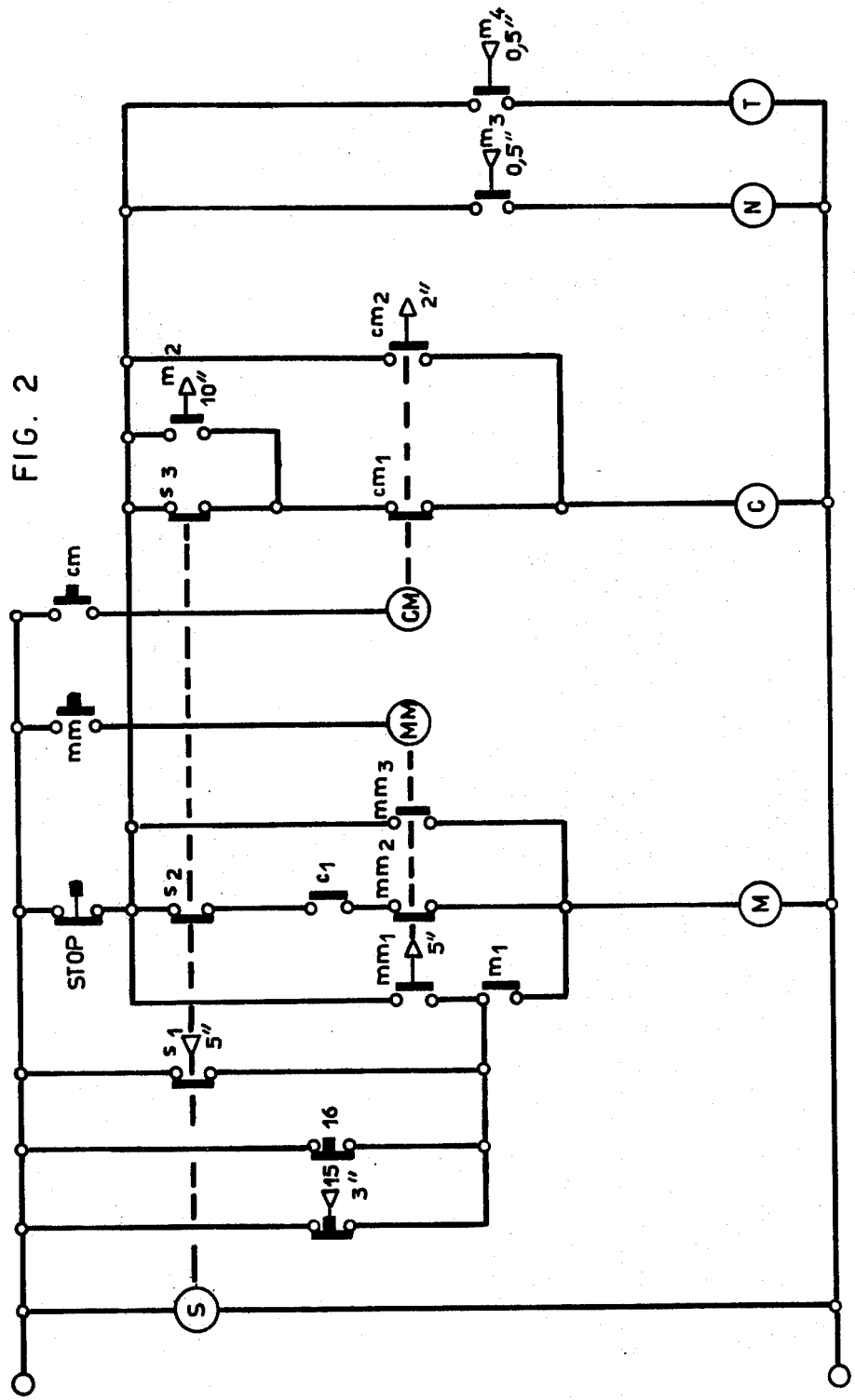
FIG. 2 is a wiring diagram for the cutting device.

On the wiring diagram of FIG. 2 are shown:
relay M controlling for starting and braking the motor 2 of the chopping device 3 and its switches $m_1$ to $m_4$; relay C for starting (and stopping) the conveyor 9, and its switch $c_1$; electrovalve N controlling nozzles 8; electrovalve T controlling the cylinder 6 for advance (and return) of the trough 7; switch 15 acted on by element 15a when the molds 13 are in a convenient position; switch 16 acted on by the driving mechanism of the chopping device 3 when blade 3a is in its retracted position; relay S of the revolution counter 14 of the carrying device 13a, and its switches $s_1$ to $s_3$; relay MM for manual control of relay M of the motor 2, with its hand-contactor $mm$ and its switches $mm_1$ to $mm_3$; relay CM for manual control of relay C of the conveyor 9, with its hand-contactor cm and its switches $cm_1$; $cm_2$; safety contactor STOP. All switches are shown at rest. Their temporizations are indicated through an arrow, with the delay given in seconds.

The device works as will be explained below:
As long as hand-contactors $mm$ and cm are open, as usual, and the blowing device 13a moves normally, switches $mm_1$ and $mm_3$ remain open, $mm_2$ is closed; $cm_1$ is closed and $cm_2$ is open. Relay S is excited by the revolution counter 14; $s_1$, $s_2$, $s_3$ thus are open. Switches 15 and 16 close periodically but, as long as memory-switch $m_1$ is open, relay M is not energized. Switches $m_2$, $m_3$, $m_4$ are open; thus relays C, N, T are not energized and the whole device is at rest.

Appropriate sensors (not shown) cause the blowing device 13a to stop when a malfunction appears, such as a failure of the blowing, a bad stripping of a molded article etc. As soon as blowing device 13 is stopped, or if it is merely slowed down, the revolution counter 14 ceases exciting relay S, thus switches $s_1$ to $s_3$ close, relay C is energized, conveyor 9 starts and authorization switch $C_1$ closes: M in turn is energized and the chopping device 3 enters into operation; switches $m_1$ and $m_2$ become closed; switches $m_3$ and $m_4$ become closed, thus N and T are energized and the whole device begins working. As soon as the malfunction is settled and the blowing device 13a turns again at its normal speed, S becomes excited, switches $s_1$ to $s_3$ become opened; relay M keeps on being excited through switch $m_1$ and both switches 15 and 16, but, when the element 15a of a mold passes in the convenient position in front of switch 15, the latter becomes opened; then, as soon as the blade 3a of the chopping device 3 comes to its back position thus opening switch 16, supply of relay M is cut, and the chopping device 3 stops. Then switches $m_1$ to $m_4$ open again; relays C, N, and T cease to be energized and the device becomes at rest.

It may easily be seen that the operator can, at will, start the conveyor 9 by means of the hand-contactor cm, through relay CM, switch $cm_2$ and relay C.

In the same way, he can put the chopping device 3 into operation by means of the contactor $mm$, through its relay MM, switch $mm_3$ and relay M, even if the speed of the blowing device 13a is at the settled value. Energization of relay M causes also relays C, N and T to be energized.

When contactor *mm* is released by the operator, switch $mm_3$ again opens, but switch $mm_1$ keeps closed during a sufficient time, that allows a further mold to pass in front of detector 15. After releasing of switch $mm_1$, the opening of switches 15 and 16 cuts the supply of relay M, that causes the whole device to stop as explained hereabove.

Action on safety contactor STOP puts the whole device at rest as soon as blade 3a is in its retracted position.

On a discontinuous parison machine there may be added to the parison cutting device a specialized form of cutter but it is in general possible to use, for chopping the parison in accordance with the invention, the cutting blade or blades which are already provided on condition that they be provided with an auxiliary control in accordance with the invention so as to drive them at a much higher than their normal speed, the latter of which of course corresponds to the rate of passage of the molds across the path of the parison as it emerges from the extruder.

While the invention has been described hereinabove in terms of a number of presently preferred embodiments thereof, the invention itself is not limited thereto but rather comprehends all modifications of and departures from those embodiments properly falling within the spirit and scope of the appended claims.

I claim:

1. In a blow molding apparatus having means for extruding a tubular parison along a predetermined path, a plurality of sets of molds supported for motion in cyclical fashion across said path of the parison emerging from said extruding means during normal operation of the apparatus, means for sensing an interruption of said normal operation, collecting means movable, in response to said sensing means upon interruption of said normal operation from a normally retracted position out of said path to an advanced position disposed across said path, and movable cutting means disposed adjacent said path between said extruding means and the collecting means when in said advanced position for movement through said parison to sever the latter, the improvement comprising:
  a. driving means connected to said severing means for actuating said cutting means repeatedly during interruption of said normal operation and in response to sensing of said interruption to sever said parison into fragments which have a length, as measured along said path, which is a small fraction of the length received by the molds during said normal operation.

2. Blow molding apparatus according to claim 1 wherein said cutting means include two blades subjected to oppositely phased reciprocating motions crosswise of said path.

3. Blow molding apparatus according to claim 1 wherein said cutting means include a blade pivotally mounted outside said path for arcuate motion across said path.

4. Blow molding apparatus according to claim 1 further including conveyor means positioned to receive fragments delivered by said collecting means.

5. Blow molding apparatus according to claim 4 wherein said conveyor means include means to detect the presence of foreign matter among said fragments.

6. Blow molding apparatus according to claim 1 including means to direct a jet of gas into said path below said cutting means for directing said fragments into said collecting means.

7. In a blow molding apparatus having means for extruding a tubular parison along a predetermined path, a plurality of sets of molds supported for motion in cyclical fashion across said path of the parison emerging from said extruding means during normal operation of the apparatus, means for sensing an interruption of said normal operation, collecting means movable, in response to said sensing means upon interruption of said normal operation from a normally retracted position out of said path to an advanced position disposed across said path, and movable cutting means disposed adjacent said path between said extruding means and the collecting means when in said advanced position for movement through said parison to sever the latter, the improvement comprising:
  a. driving means connected to said cutting means for moving said cutting means through said parison repeatedly during interruption of said normal operation to sever said parison into fragments having a length, as measured along said path, of about one centimeter.

8. In a blow molding apparatus having means for extruding a tubular parison along a predetermined path, a plurality of sets of molds supported for motion in cyclical fashion across said path of the parison emerging from said extruding means during normal operation of the apparatus, means for sensing an interruption of said normal operation, collecting means movable, in response to said means upon interruption of said normal operation from a normally retracted position out of said path to an advanced position disposed across said path, and movable cutting means disposed adjacent said path between said extruding means and the collecting means when in said advanced position for movement through said parison to sever the latter, the improvement comprising:
  a. driving means connected to said cutting means for cyclically moving said cutting means through said parison in a continuous manner during interruption of said normal operation and at a frequency high enough to sever the parison into fragments sufficiently small to permit rapid cooling without change in their chemical properties caused by slow cooling.

* * * * *

UNITED STATES PATENT AND TRADEMARK OFFICE
CERTIFICATE OF CORRECTION

PATENT NO. : 3,994,647
DATED : November 30, 1976
INVENTOR(S) : Guy A. Flamand

It is certified that error appears in the above-identified patent and that said Letters Patent are hereby corrected as shown below:

Column 6, line 41, "said means" should read --said sensing means--.

Signed and Sealed this

Twenty-sixth Day of April 1977

[SEAL]

Attest:

RUTH C. MASON
*Attesting Officer*

C. MARSHALL DANN
*Commissioner of Patents and Trademarks*